US012682425B2

(12) United States Patent
Nan

(10) Patent No.: US 12,682,425 B2
(45) Date of Patent: Jul. 14, 2026

(54) METHOD AND DEVICE FOR PROCESSING PORTRAIT IMAGE, ELECTRONIC EQUIPMENT, AND STORAGE MEDIUM

(71) Applicant: Black Sesame Technologies Co., Ltd., Wuhan (CN)

(72) Inventor: Yuanyuan Nan, Wuhan (CN)

(73) Assignee: Black Sesame Technologies Co., Ltd. (CN)

( * ) Notice: Subject to any disclaimer, the term of this patent is extended or adjusted under 35 U.S.C. 154(b) by 343 days.

(21) Appl. No.: 18/218,971

(22) Filed: Jul. 6, 2023

(65) Prior Publication Data

US 2024/0013358 A1    Jan. 11, 2024

(30) Foreign Application Priority Data

Jul. 6, 2022    (CN) .......................... 202210799065.1

(51) Int. Cl.
*G06T 5/50*          (2006.01)
*G06T 3/4007*       (2024.01)
(Continued)

(52) U.S. Cl.
CPC .............. *G06T 5/50* (2013.01); *G06T 3/4007* (2013.01); *G06T 3/4038* (2013.01); *G06T 5/20* (2013.01);
(Continued)

(58) Field of Classification Search
CPC ....... G06T 5/50; G06T 3/4007; G06T 3/4038; G06T 5/20; G06T 2207/20224;
(Continued)

(56) References Cited

U.S. PATENT DOCUMENTS

2010/0177981 A1*   7/2010   Wang ........................ G06T 7/11
                                                                   382/260
2022/0122224 A1*   4/2022   Perazzi ................ G06V 30/274

FOREIGN PATENT DOCUMENTS

CN        101916370 A  * 12/2010
CN        114049262 A  *  2/2022   ............... G06T 5/50
CN        114494066 A  *  5/2022   ............... G06T 7/40

OTHER PUBLICATIONS

Arakawa K . Nonlinear image processing for beautifying facial images [C]// Nonlinear Signal & Image Processing, Nsip Abstracts IEEE-EURASIP. IEEE, 2005.
(Continued)

*Primary Examiner* — Stephen R Koziol
*Assistant Examiner* — Michael Kim Maiden
(74) *Attorney, Agent, or Firm* — Timothy T. Wang; Panorama IP Group PLLC

(57)                ABSTRACT

The present application relates to a method and a device for processing a portrait image. The method includes determining a skin region, a skin flat region, a speckle region, and a portrait structure region. Performing a dermabrasion processing on the skin flat region and a speckle removal processing on the speckle region and overlaying the high-frequency output image after dermabrasion and speckle removal with the low-frequency output image after dermabrasion and speckle removal, to obtain a skin region output image. The method enables to present realistic skin texture and protect the clarity of portrait structure while achieving dermabrasion and speckle removal on skin in a portrait image.

14 Claims, 12 Drawing Sheets determining a skin region image in a portrait image to be processed, as well as a skin flat region, a speckle region, and a portrait structure region comprised in a high-frequency component image and a low-frequency component image of the skin region image ⟋ S210 performing a dermabrasion processing on the skin flat region and a speckle removal processing on the speckle region in the high-frequency component image and the low-frequency component image, respectively, with protection for the portrait structure region in the high-frequency component image and the low-frequency component image, to obtain a high-frequency output image after dermabrasion and speckle removal and a low-frequency output image after dermabrasion and speckle removal ⟋ S220 overlaying the high-frequency output image after dermabrasion and speckle removal with the low-frequency output image after dermabrasion and speckle removal, to obtain a skin region output image ⟋ S230

(51) Int. Cl.
    *G06T 3/4038*       (2024.01)
    *G06T 5/20*        (2006.01)

(52) U.S. Cl.
    CPC ............... *G06T 2207/20224* (2013.01); *G06T 2207/30088* (2013.01)

(58) Field of Classification Search
    CPC . G06T 2207/30088; G06T 2207/30201; G06T 5/70; G06T 3/04; G06V 10/26; G06V 40/16; G06V 40/168
    See application file for complete search history.

(56)           References Cited

OTHER PUBLICATIONS

Cho K M , Jang J H , Hong K S . Adaptive skin-color filter[J]. Pattern Recognition, 2001, 34( 5):1067-1073.

杨虎, 李航, 朱晨辰,等. 基于保边滤波的人脸美颜技术分析[J]. 河南科技 2020, No. 703(05):42-44.

Ronneberger O , Fischer P , Brox T . U-Net: Convolutional Networks for Biomedical Image Segmentation[J]. Springer, Cham, 2015.

\* cited by examiner

S210 determining a skin region image in a portrait image to be processed, as well as a skin flat region, a speckle region, and a portrait structure region comprised in a high-frequency component image and a low-frequency component image of the skin region image

S220 performing a dermabrasion processing on the speckle region in the skin flat region and a speckle removal processing on the skin flat region in the high-frequency component image and the low-frequency component image, respectively, with protection for the portrait structure region in the high-frequency component image and the low-frequency component image, to obtain a high-frequency output image after dermabrasion and speckle removal and a low-frequency output image after dermabrasion and speckle removal

S230 overlaying the high-frequency output image after dermabrasion and speckle removal with the low-frequency output image after dermabrasion and speckle removal, to obtain a skin region output image

Fig. 2 device for processing a portrait image 1000 region image determination module 1010 region image processing module 1020 skin region output module 1030

METHOD AND DEVICE FOR PROCESSING PORTRAIT IMAGE, ELECTRONIC EQUIPMENT, AND STORAGE MEDIUM

FIELD OF THE INVENTION

The present application relates to the field of image processing technology, and particularly, to a method and a device for processing a portrait image, an electronic equipment, and a storage medium.

BACKGROUND OF THE INVENTION

In mobile phones and other photography and video equipments, photography and video beautification are widely used. In the process of beautifying captured portrait images, dermabrasion and speckle removal algorithms may be used in dermabrasion and speckle removal processing for the portrait skin regions in the portrait images, to obtain a better appearance for the skin. An ideal dermabrasion and speckle removal algorithm requires both the ability to remove blemishes in portrait skin (such as freckles, acne marks, pigment mass deposition, etc.) and the final presentation of a delicate and realistic skin texture, without losing the clarity of the portrait contour.

However, most existing dermabrasion and speckle removal algorithms are prone to significant loss of details during the process of dermabrasion and speckle removal on portrait skin regions, resulting in overly blunt and unnatural effects. It has become an urgent demand to beautify the skin of portraits with nature and fidelity.

SUMMARY OF THE INVENTION

On this Basis, it is necessary to provide a method and a device for processing a portrait image, an electronic equipment, and storage medium capable of retaining a true texture of a portrait image while performing dermabrasion and speckle removal on the portrait image.

A method for processing a portrait image, including: determining a skin region image in a portrait image to be processed, as well as a skin flat region, a speckle region, and a portrait structure region included in a high-frequency component image and a low-frequency component image of the skin region image; performing a dermabrasion processing on the skin flat region and a speckle removal processing on the speckle region in the high-frequency component image and the low-frequency component image, respectively, with protection for the portrait structure region in the high-frequency component image and the low-frequency component image, to obtain a high-frequency output image after dermabrasion and speckle removal and a low-frequency output image after dermabrasion and speckle removal; and overlaying the high-frequency output image after dermabrasion and speckle removal with the low-frequency output image after dermabrasion and speckle removal, to obtain a skin region output image.

According to one embodiment, the determining a skin region image in a portrait image to be processed, as well as a skin flat region, a speckle region, and a portrait structure region included in a high-frequency component image and a low-frequency component image of the skin region image includes: identifying and extracting the skin region image from the portrait image to be processed; dividing the skin region image into the high-frequency component image and the low-frequency component image; and identifying the skin flat region, the speckle region, and the portrait structure region included in the high-frequency component image and the low-frequency component image, respectively.

According to one embodiment, the method for processing a portrait image further includes: extracting a non-skin region image from the portrait image to be processed; and stitching the non-skin region image with the skin region output image, to obtain a portrait output image.

According to one embodiment, the dividing the skin region image into the high-frequency component image and the low-frequency component image includes: performing Gaussian filtering on the skin region image to obtain the low-frequency component image; and subtracting the low-frequency component image from the skin region image, to obtain the high-frequency component image.

According to one embodiment, the performing a dermabrasion processing on the skin flat region and a speckle removal processing on the speckle region in the high-frequency component image and the low-frequency component image, respectively, with protection for the portrait structure region in the high-frequency component image and the low-frequency component image, to obtain a high-frequency output image after dermabrasion and speckle removal and a low-frequency output image after dermabrasion and speckle removal includes: performing a first dermabrasion processing on the skin flat region and a first speckle removal processing on the speckle region in the high-frequency component image, with protection for the portrait structure region in the high-frequency component image, to obtain the high-frequency output image after dermabrasion and speckle removal; and performing a second dermabrasion processing on the skin flat region and a second speckle removal processing on the speckle region in the low-frequency component image, with protection for the portrait structure region in the low-frequency component image, to obtain the low-frequency output image after dermabrasion and speckle removal.

According to one embodiment, the first dermabrasion processing is different from the second dermabrasion processing, and/or the first speckle removal processing is different from the second speckle removal processing.

According to one embodiment, the performing a dermabrasion processing on the skin flat region in the high-frequency component image includes: performing nonlinear attenuation on the skin flat region in the high-frequency component image; wherein, in the nonlinear attenuation, each pixel value in the high-frequency component image is multiplied by a variable attenuation coefficient that decreases with the decrease of the pixel value multiplied thereby.

According to one embodiment, performing the speckle removal processing on the speckle region in the high-frequency component image includes: performing mirror four-vertex linear interpolation on each pixel in the speckle region in the high-frequency component image, to fill each pixel; wherein, in the mirror four-vertex linear interpolation, for a target pixel to be filled, four boundaries of the speckle region having the target pixel in four direction as of top bottom, left, and right are determined and taken respectively as centers to determine four symmetrical pixels outside the speckle region of the target pixel, and a value determined by performing bilinear interpolation on the four symmetrical pixels is used as the pixel value of the target pixel, so as to fill the target pixel.

According to one embodiment, the performing a dermabrasion processing on the skin flat region in the low-frequency component image includes: performing surface filtering on the skin flat region in the low-frequency component image.

According to one embodiment, performing the speckle removal processing on the speckle region in the low-frequency component image includes: performing adjacent four-vertex linear interpolation on each pixel in the speckle region in the low-frequency component image, to fill each pixel; wherein, in the adjacent four-vertex linear interpolation, for a target pixel to be filled, four nearest neighbor pixels to the target pixel outside the speckle region in four directions of top, bottom, left and right are determined, and a value determined by performing bilinear interpolation on the four nearest neighbor pixels is used as the pixel value of the target pixel, so as to fill the target pixel.

According to one embodiment, the protection for the portrait structure region in the high-frequency component image and the low-frequency component image includes: generating a mask for the portrait structure region; wherein, the mask is used to ensure that, it is prohibited to perform the dermabrasion processing or the speckle removal processing on the portrait structure region, when performing a dermabrasion processing on the skin flat region and a speckle removal processing on the speckle region in the high-frequency component image and the low-frequency component image.

A device for processing a portrait image, including: a region image determination module for determining a skin region image in a portrait image to be processed, as well as a skin flat region, a spot region, and a portrait structure region included in a high-frequency component image and a low-frequency component image of the skin region image; a region image processing module for performing a dermabrasion processing on the skin flat region and a speckle removal processing on the speckle region in the high-frequency component image and the low-frequency component image, respectively, with protection for the portrait structure region in the high-frequency component image and the low-frequency component image, to obtain a high-frequency output image after dermabrasion and speckle removal and a low-frequency output image after dermabrasion and speckle removal; and a skin region output module for overlaying the high-frequency output image after dermabrasion and speckle removal with the low-frequency output image after dermabrasion and speckle removal, to obtain a skin region output image.

An electronic equipment, including a memory that stores a computer program and a processor that executes the computer program by determining a skin region image in a portrait image to be processed, as well as a skin flat region, a speckle region, and a portrait structure region included in a high-frequency component image and a low-frequency component image of the skin region image; performing a dermabrasion processing on the skin flat region and a speckle removal processing on the speckle region in the high-frequency component image and the low-frequency component image, respectively, with protection for the portrait structure region in the high-frequency component image and the low-frequency component image, to obtain a high-frequency output image after dermabrasion and speckle removal and a low-frequency output image after dermabrasion and speckle removal; and overlaying the high-frequency output image after dermabrasion and speckle removal with the low-frequency output image after dermabrasion and speckle removal, to obtain a skin region output image.

A computer-readable storage medium on which a computer program is stored, wherein the computer program is executed by a processor by determining a skin region image in a portrait image to be processed, as well as a skin flat region, a speckle region, and a portrait structure region included in a high-frequency component image and a low-frequency component image of the skin region image; performing a dermabrasion processing on the skin flat region and a speckle removal processing on the speckle region in the high-frequency component image and the low-frequency component image, respectively, with protection for the portrait structure region in the high-frequency component image and the low-frequency component image, to obtain a high-frequency output image after dermabrasion and speckle removal and a low-frequency output image after dermabrasion and speckle removal; and overlaying the high-frequency output image after dermabrasion and speckle removal with the low-frequency output image after dermabrasion and speckle removal, to obtain a skin region output image.

The above-mentioned method and device for processing a portrait image, electronic equipment, and storage medium enable to perform optimization processing specific to different high and low frequency components and different types of skin regions, while maximize the retained clarity of the portrait structure region, by means of determining the skin region image in the portrait image to be processed, as well as the skin flat region, the speckle region, and the portrait structure region included in the high-frequency component image and the low-frequency component image of the skin region image, and performing a dermabrasion processing on the skin flat region and a speckle removal processing on the speckle region in the high-frequency component image and the low-frequency component image, respectively, with protection for the portrait structure region in the high-frequency component image and the low-frequency component image. Thus, enabling to present realistic skin texture and protect the clarity of portrait structure while achieve dermabrasion and speckle removal on skin in a portrait image, making the beautified portrait image have a more realistic texture. Other objectives and aspects of the invention will become apparent from the following detailed description, taken in conjunction with the accompanying drawings, which illustrate, by way for example, the features in accordance with embodiments of the invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles. Furthermore, the drawings may contain text or captions that may explain certain embodiments of the present invention. This text is included for illustrative, non-limiting, explanatory purposes of certain embodiments detailed in the present invention. In the drawings:

Embodiments of the invention are described with reference to the following figures. The same numbers are used throughout the figures to reference similar features and components. The features depicted in the figures are not necessarily shown to scale. Certain features of the embodiments may be shown exaggerated in scale or in somewhat schematic form, and some details of elements may not be shown in the interest of clarity and conciseness.

FIG. 2 is a schematic flowchart of a method for processing a portrait image according to one embodiment.

DETAILED DESCRIPTION OF THE INVENTION

Figure 1:
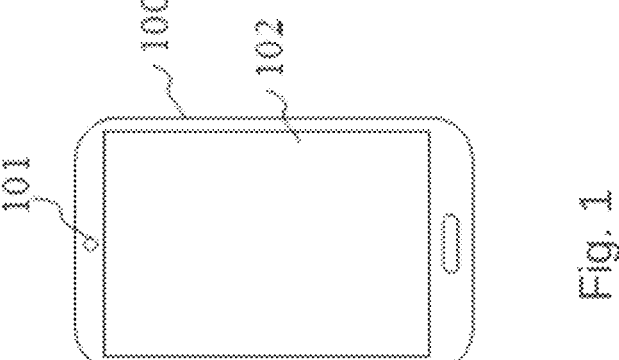
FIG. 1 is a schematic view of an electronic equipment according to one embodiment.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For clarity, details relating to technical material that is known in the technical fields related to the invention have not been described in detail so as not to unnecessarily obscure the present invention.

In the description and claims of the application, each of the words "units" represents the dimension in any units such as centimeters, meters, inches, foots, millimeters, micrometer and the like and forms thereof, are not necessarily limited to members in a list with which the words may be associated.

In the description and claims of the application, each of the words "comprise", "include", "have", "contain", and forms thereof, are not necessarily limited to members in a list with which the words may be associated. Thus, they are intended to be equivalent in meaning and be open-ended in that an item or items following any one of these words is not meant to be an exhaustive listing of such item or items or meant to be limited to only the listed item or items. It should be noted herein that any feature or component described in association with a specific embodiment may be used and implemented with any other embodiment unless clearly indicated otherwise.

Regarding applicability of 35 U.S.C. § 112, 916, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items from the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present invention contains headers. It should be understood that these headers are used as references and are not to be construed as limiting upon the subjected matter disclosed under the header.

This specification comprises references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

The presence of broadening words and phrases such as "one or more," "at least," "but not limited to" or other like phrases in some instances shall not be read to mean that the narrower case is intended or required in instances where such broadening phrases may be absent.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present disclosure, the preferred systems and methods are now described.

In order to make the purposes, technical solutions, and advantages of the present application clearer, the following is a further detailed explanation of the present application in conjunction with the accompanying drawings and embodiments. It should be understood that, the specific embodiments described here are only used to explain and are not intended to limit the present application.

The method for processing a portrait image provided in the present application may be applied to the electronic equipment 100 shown in FIG. 1, which may be, but is not limited to, various smartphones, digital cameras, personal computers, laptops, tablets, etc. The electronic equipment 100 may be equipped with a camera 101, captures a portrait image to be processed in real time through the camera 101, and performs the method for processing a portrait image according to embodiments of the present application on the portrait image, to obtain a skin region output image for subsequent applications. According to an alternative embodiment, the electronic equipment 100 may also obtain the portrait image to be processed from other equipments through network or other communication manners, or read the portrait image to be processed from the local memory, and then perform the method for processing a portrait image according to embodiments of the present application on the obtained portrait image. The electronic equipment 100 may further be equipped with a display screen 102, so that the electronic equipment 100 may display an obtained skin region output image or a further processed skin region output image on the display screen 102 for users to view.

Figure 2:
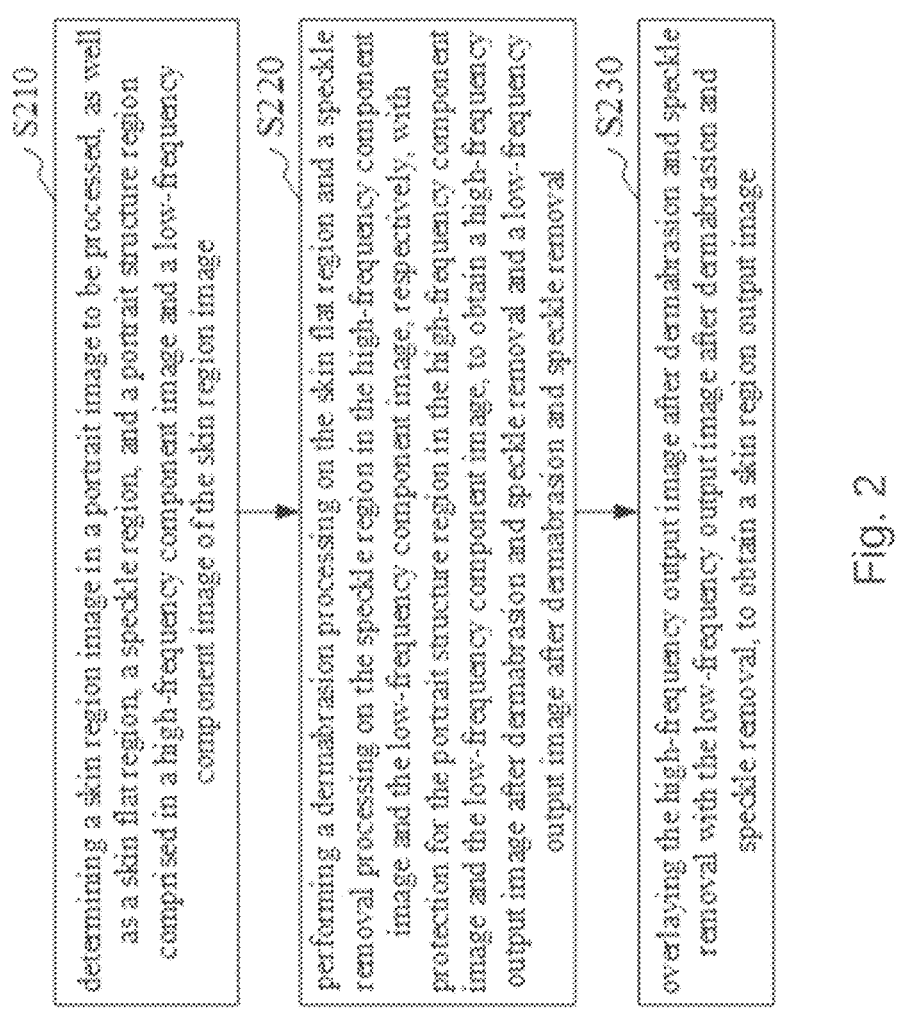
Figure 4:
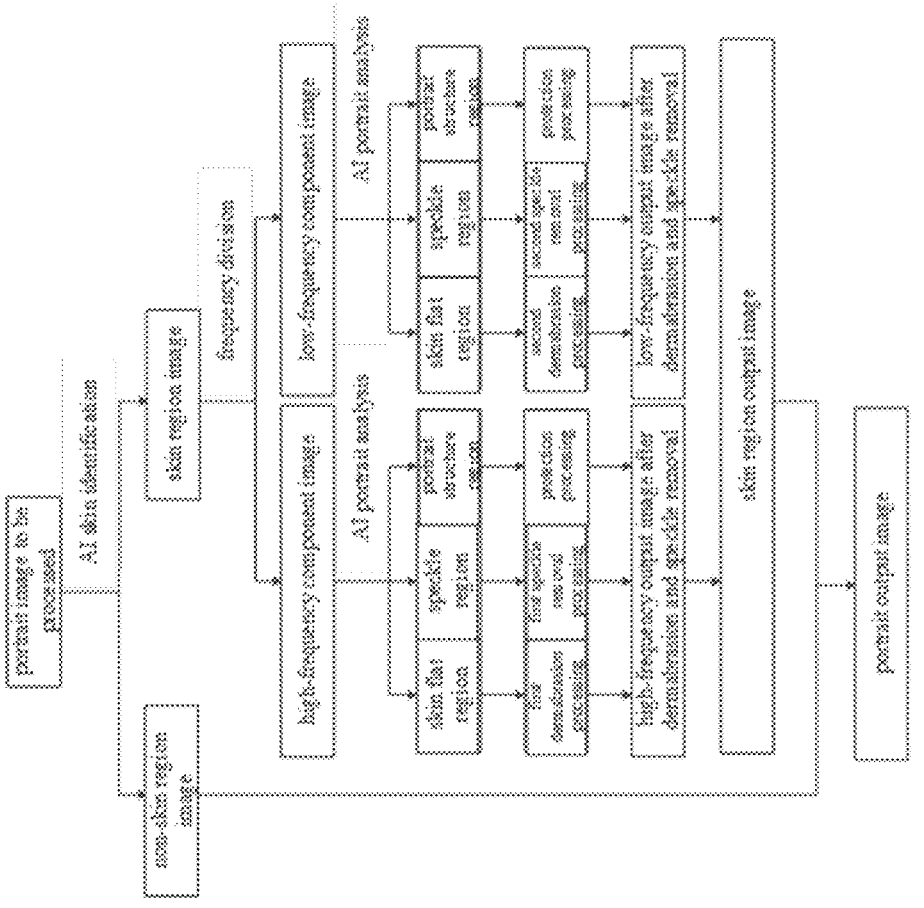
FIG. 4 is a schematic flowchart of a method for processing a portrait image according to one embodiment.

According to one embodiment, what is provided is a method for processing a portrait image, which may be applied in the electronic equipment 100 shown in FIG. 1. As shown in FIGS. 2 and 4, this method comprises the following steps S210-S230.

Step S210. determining a skin region image in a portrait image to be processed, as well as a skin flat region, a speckle region, and a portrait structure region included in a high-frequency component image and a low-frequency component image of the skin region image.

Figure 3:
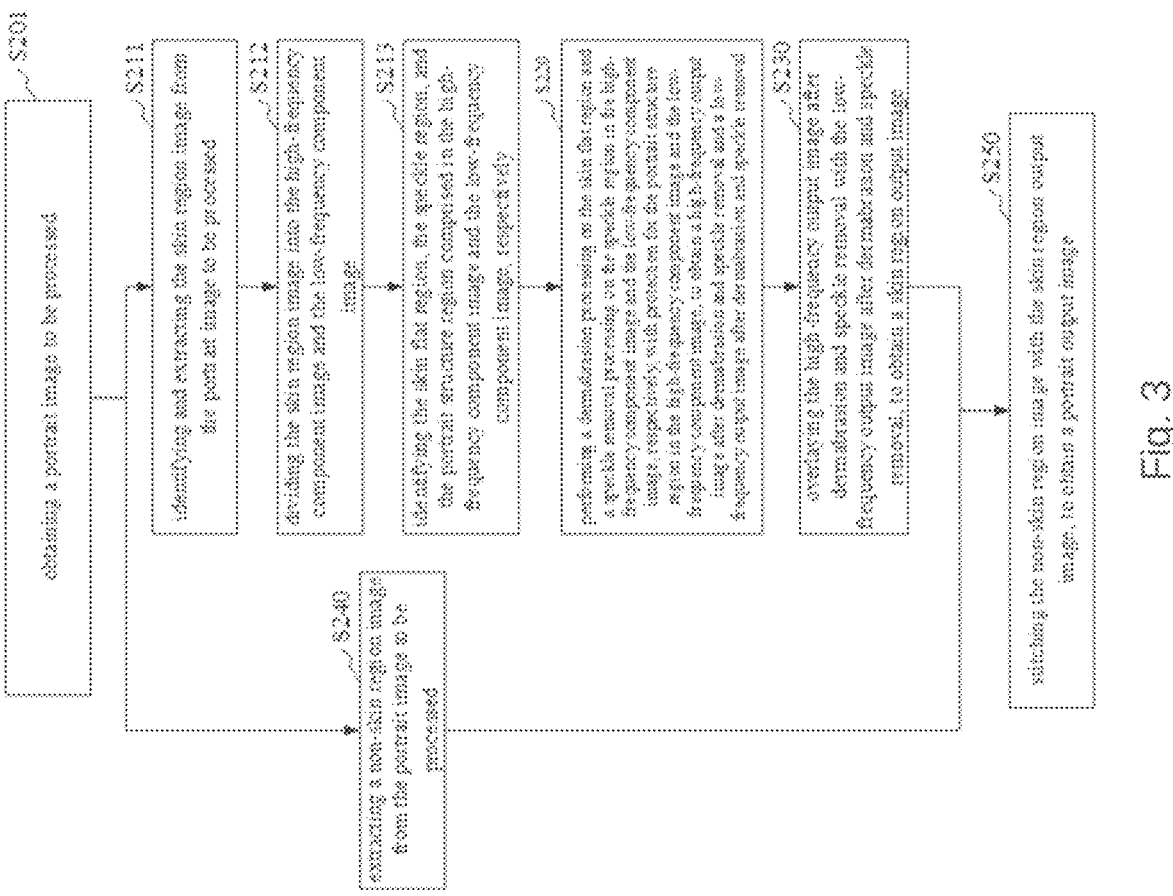
FIG. 3 is a schematic flowchart of a method for processing a portrait image according to one embodiment.

According to one embodiment, as shown in FIG. 3, step S210 may include the following steps S211-S213.

Step S211. identifying and extracting the skin region image from the portrait image to be processed.

As shown in FIG. 3, the method may further include: step S201. obtaining the portrait image to be processed before step S210.

Here, the portrait image to be processed may be an original image captured in real-time by the electronic equipment 100, or an image after certain processing on the original image, or may also be an image read from other equipment or the local memory of the electronic equipment 100. The portrait image to be processed contains information about a portrait.

The skin region refers to the area(s) where the human skin is generally located in the image. For example, the skin region may include facial regions for facial beautification applications. However, it should be understood that, in practical applications, the skin region may also include other human skin regions such as ears, neck, hands, etc. that is, the method for processing a portrait image according to the present application may also identify and process other human skin regions such as ears, neck, arms, hands, etc. during application.

Identification of the skin region may be achieved using any known techniques, such as, Artificial Intelligence (AI) models, etc., such as, for example, the U-NET model recited in the literature "Ronneberger O, Fischer P, Brox T. U-Net: Convolutional Networks for Biomedical Image Segmentation[J]. Springer, Cham, 2015", the present application will thus not elaborate thereon. After identifying the skin region from the portrait image, the skin region image in the skin region may be extracted accordingly.

Step S212. dividing the skin region image into a high-frequency component image and a low-frequency component image.

The high-frequency component in the portrait image represents a part of the image where the color and texture change sharply, while the low-frequency component in the portrait image represents a part of the image where the color and texture change slowly. Generally speaking, skin texture information and speckle blemishes of portraits are mainly concentrated in the high-frequency component, while relatively large speckles and facial structure information of skin mainly exist in the low-frequency component.

In this step, the skin region image is divided into a high-frequency component image and a low-frequency component image by frequency division processing, in order to perform differential processing on the high-frequency component image and low-frequency component image subsequently, making the skin tone more uniform and the skin texture more delicate and realistic after dermabrasion and speckle removal. Frequency division processing is carried out for each pixel in the skin region image. By dividing each pixel in the skin region image into a high-frequency component pixel and a low-frequency component pixel, all the high-frequency component pixels form a high-frequency component image, and all the low-frequency component pixels form a low-frequency component image, the skin region image is thus divided into a high-frequency component image and a low-frequency component image. It should be understood that, the high-frequency component image and low-frequency component image obtained by division will have the same resolution as the skin region image, respectively.

Step S213. identifying the skin flat region, the speckle region, and the portrait structure region included in the high-frequency component image and low-frequency component image, respectively.

Here, the skin flat region refers to areas where the skin is evenly distributed, such as face, forehead, chin, and other areas. For example, the skin flat region may be roughly equal to the remaining part of the skin region after removing the speckle region and the portrait structure region. The speckle region refers to areas in the skin where freckles, acne marks, and other blemishes are located. The portrait structure region refers to areas that need to be protected where the organ structures in a human body is located. The portrait structure region may be specifically defined as including different regions according to the application needs. Taking application to facial beauty as an example, the portrait structure region may include areas where eyes, eyebrows, nose, mouth, and outer contour of the face are located. In other embodiments, however, the portrait structure region may also include more or fewer areas or different areas. For example, for hand beautification, the portrait structure region may include areas where, such as, nails and the contour of the hand are located.

Identification of the skin flat region, the speckled region, and the portrait structure region may be achieved using any known techniques, such as, AI models, etc., such as, for example, the U-NET model recited in the literature "Ronneberger O, Fischer P, Brox T. U-Net: Convolutional Networks for Biomedical Image Segmentation[J]. Springer, Cham, 2015", the present application will thus not elaborate thereon.

It should be understood that, for steps S212-S213, it is also possible to identify the skin flat region, the speckle region, and the portrait structure region from the skin region image first, and then divide the identified skin region image into the high-frequency component image and the low-frequency component image. Alternatively, for steps S211-S213, it is also possible to identify the skin region, the skin flat region, the speckle region, and the portrait structure region from the portrait image to be processed first, and then extract the skin region image and perform frequency division processing, and so on. These equivalents are likewise capable of determining the skin flat region, the speckle region, and the portrait structure region included in the high-frequency component image and the low-frequency component image.

Step S220. performing a dermabrasion processing on the skin flat region and a speckle removal processing on the speckle region in the high-frequency component image and the low-frequency component image, respectively, with protection for the portrait structure region in the high-frequency component image and the low-frequency component image, to obtain a high-frequency output image after dermabrasion and speckle removal and a low-frequency output image after dermabrasion and speckle removal.

Specifically, this step S220 may include: performing a first dermabrasion processing on the skin flat region and a first speckle removal processing on the speckle region in the high-frequency component image, with protection for the portrait structure region in the high-frequency component image, to obtain the high-frequency output image after dermabrasion and speckle removal; and performing a second dermabrasion processing on the skin flat region and a second speckle removal processing on the speckle region in the low-frequency component image, with protection for the portrait structure region in the low-frequency component image, to obtain the low-frequency output image after dermabrasion and speckle removal.

Step S230. overlaying the high-frequency output image after dermabrasion and speckle removal with the low-frequency output image after dermabrasion and speckle removal, to obtain a skin region output image.

Here, "overlaying" refers to a process of adding pixel values of corresponding pixels in two images. The high-frequency output image after dermabrasion and speckle removal has the same resolution as the low-frequency output image after dermabrasion and speckle removal. Therefore, in this step, it is possible to add the pixel value of each pixel in the high-frequency output image after dermabrasion and speckle removal and the pixel value of the corresponding pixel at the corresponding position in the low-frequency output image after dermabrasion and speckle removal to obtain the skin region output image.

The above-mentioned method for processing a portrait image enables to perform optimization processing specific to different high and low frequency components and different types of skin regions, while maximize the retained clarity of the portrait structure region, by means of determining the skin region image in the portrait image to be processed, as well as the skin flat region, the speckle region, and the portrait structure region included in the high-frequency component image and the low-frequency component image of the skin region image, and performing a dermabrasion processing on the skin flat region and a speckle removal processing on the speckle region in the high-frequency component image and the low-frequency component image, respectively, with protection for the portrait structure region in the high-frequency component image and the low-frequency component image. Thus, enabling to present realistic skin texture and protect the clarity of portrait structure while achieve dermabrasion and speckle removal on skin in a portrait image, making the beautified portrait image have a more realistic texture.

According to one embodiment, referring to FIGS. 3 and 4, the method for processing a portrait image further includes the following steps S240-S250.

Step S240. extracting a non-skin region image from the portrait image to be processed;

Step S250. stitching the non-skin region image with the skin region output image, to obtain a portrait output image.

Here, the non-skin region refers to images of regions that generally do not include skin. The non-skin region may include, for example, backgrounds, clothing, etc. In this embodiment, the remaining area in the portrait image after removing a skin region may serve as the non-skin region after identifying the skin region. In other embodiments, image identification may also be directly performed on the portrait image to directly identify the non-skin region. After the non-skin region is determined, a non-skin region image in the non-skin region may be extracted accordingly.

According to this embodiment, the non-skin region image is further stitched with the skin region output image obtained after dermabrasion and a speckle removal processing, to obtain the portrait output image after accomplished portrait beautification, so that the portrait output image may be displayed to the user through a display screen or other means.

According to one embodiment, the dividing the skin region image into a high-frequency component image and a low-frequency component image includes: performing Gaussian filtering on the skin region image, to obtain the low-frequency component image; and subtracting the low-frequency component image from the skin region image, to obtain the high-frequency component image.

Exemplarily, the Gaussian filtering function of the performed Gaussian filtering is as follows:

$$H_{i,j} = \frac{1}{2\pi\sigma^2} e^{-\frac{i^2+j^2}{2\sigma^2}}.$$

In the above equation, $H_{i,j}$ represents a filtering parameter that is offset $(i, j)$ from the center of a filtering window in the filtering window of the Gaussian filtering, where $i$ represents a lateral offset from the center of the filtering window; $j$ represents a longitudinal offset from the center of the filtering window; and $\sigma$ is a filter standard deviation for the Gaussian filtering.

Here, the size of the filtering window mentioned above may be determined based on the face size in the skin region image, for example, may be determined according to the following equation:

$$\text{window size} = 5 + \frac{S_{face}}{100}.$$

In the above equation, window size is the size of the filtering window, and $S_{face}$ is the maximum value of the width and height of the identified face detection box in the image.

It should be understood that, as the angle of the face changes, the identified face detection box may be square or rectangular, especially be rectangular when only half of the face is left in the picture. Therefore, it is capable of more realistically reflecting the scale of the face in an actual picture to select the maximum value of the width and height to characterize the size of the face. For different pictures, the face in a picture may become smaller or larger as the face is further away from or closer to the camera. Therefore, for different pictures, the size of the face detection box is variable. The above scheme may adaptively modify parameters of the Gaussian filtering based on the size of the face in the picture.

Here, the larger the value of the filter standard deviation σ of the Gaussian filtering, the greater the dermabrasion intensity, and accordingly, the image will become blurrier. σ may have a suitable numerical value selected based on empirical values. Exemplarily, σ=20, however, other suitable values may also be taken for σ.

Herein, "subtracting" refers to a process of subtracting pixel values of the corresponding pixels in two images. The skin region image has the same resolution as the low-frequency component image in this embodiment. Therefore, in this embodiment, it is possible to subtract a pixel value of a corresponding pixel at a corresponding position in the low-frequency component image from a pixel value of each pixel in the skin region image, to obtain the skin region output image.

According to one embodiment, the first dermabrasion processing and the second dermabrasion processing in the above step S220 are different, and/or the first speckle removal processing and the second speckle processing are different.

The high frequency component image and the low frequency component image represent different display components in the skin, respectively. In this embodiment, the separate performance of different dermabrasion processing and different speckle removal processings on the high frequency component image and the low frequency component image may differentially perform more specific and suitable dermabrasion processing and speckle removal processing on the high frequency component image and the low frequency component image, thereby enabling to effectively improve the dermabrasion and speckle removal effects of the images obtained through dermabrasion processing and speckle removal processing, while making the processed images more delicate and realistic.

The high-frequency component in the skin flat region (neither the portrait structure region nor the speckle region) is mainly composed of skin texture. For the processing of this skin texture, options according to some alternative embodiments may be as follows: 1) completely preserving the high-frequency component in the skin flat region (i.e., performing no processing on the skin flat region in the high-frequency component image), which causes that the skin texture is fully preserved after the processing, and the processed skin is not delicate enough; and 2) performing linear attenuation processing on the high-frequency component, which causes that when the same attenuation coefficient is used for a stronger texture and a weaker texture, either the stronger texture may not be effectively weakened, or the weaker texture is completely eliminated, and finally, it is impossible to present such an effect that the skin texture structure is well preserved, and at the same time, the delicate skin texture is achieved, although the processed skin texture is relatively delicate.

According to one embodiment, the performing a dermabrasion processing (such as the first dermabrasion processing) on the skin flat region in the high-frequency component image includes: performing nonlinear attenuation on the skin flat region in the high-frequency component image; wherein, in the nonlinear attenuation, each pixel value in the high-frequency component image is multiplied by a variable attenuation coefficient that decreases with the decrease of the pixel value multiplied thereby.

Figure 5:
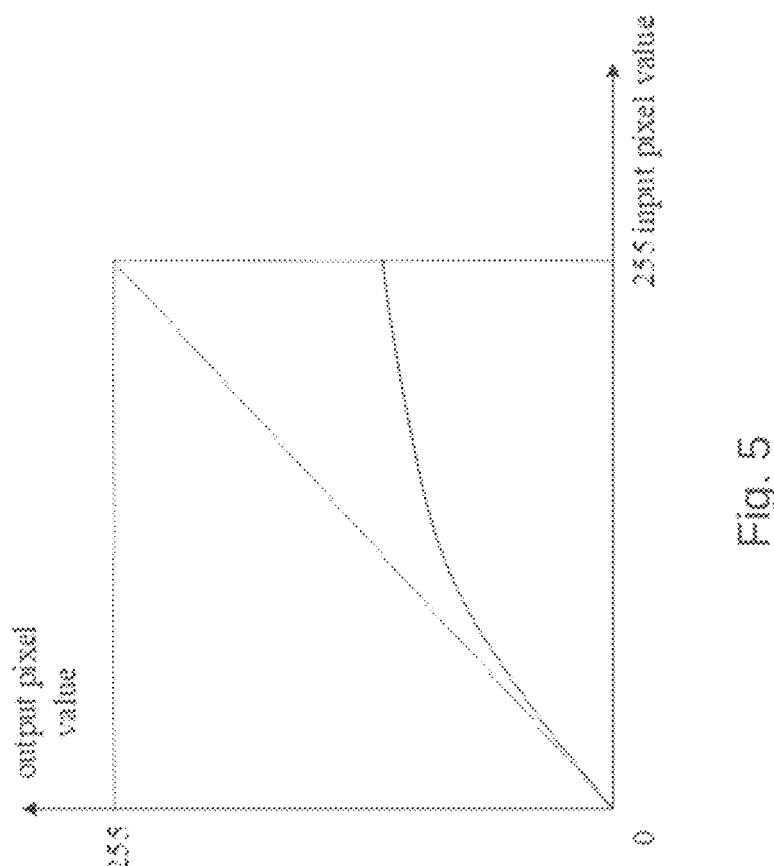
FIG. 5 is a view of a nonlinear attenuation curve according to one embodiment.

The technical solution of this embodiment adopts the nonlinear attenuation method to perform nonlinear attenuation on the skin flat region in the high-frequency component image, so that a weaker skin texture is multiplied by a smaller variable attenuation coefficient (that is, close to 1.0), and a stronger skin texture is multiplied by a greater variable attenuation coefficient (that is, close to 0.0). FIG. 5 shows the nonlinear attenuation curve corresponding to this nonlinear attenuation, which has an expression of $-0.0025 \times x^2 + x = y$, where x is an input pixel value before nonlinear attenuation, and y is an output pixel value after nonlinear attenuation. After nonlinear attenuation, the texture structure of the image is fully preserved, while the stronger texture is effectively attenuated, thereby presenting a delicate and realistic skin texture.

Figure 6:
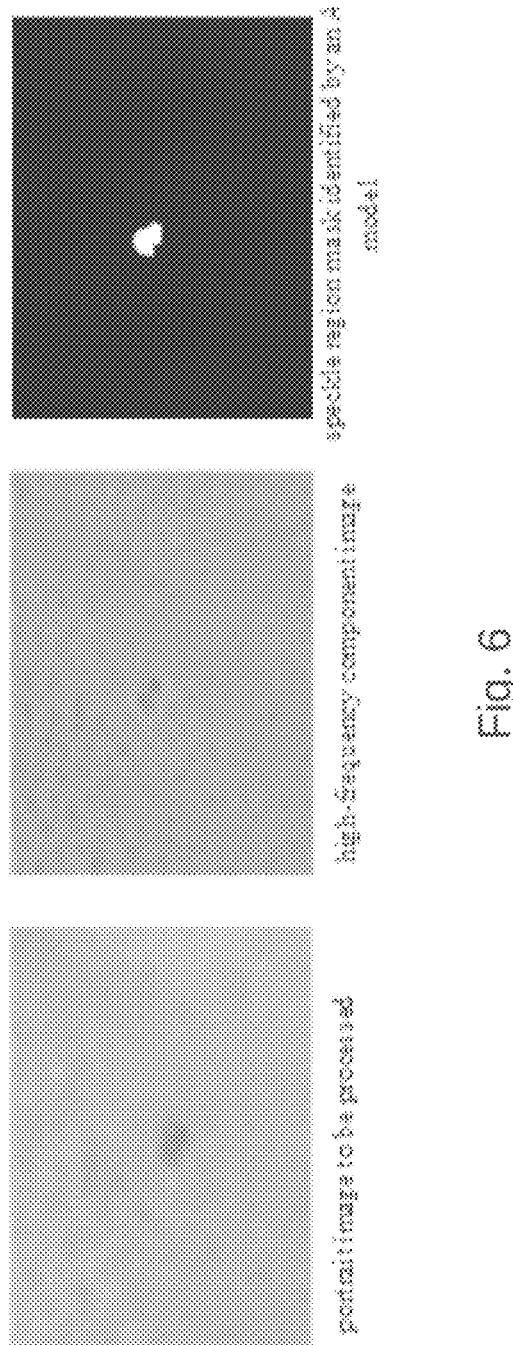
FIG. 6 is a schematic view of a speckle region mask in a high-frequency component image of a portrait image according to one embodiment.

After image frequency division, the imaging of the speckle region mask in the high-frequency component image of the portrait image is shown in FIG. 6. To achieve speckle removal effect, it is necessary to patch the pixels in the speckle region on the high-frequency component image. According to an alternative embodiment, when performing the speckle removal processing on the speckle region in the high-frequency component image, the pixel values of the speckle region (the speckle region mask shown in the right figure of FIG. 6) in the high-frequency component image may be directly cleared to zero; or alternatively, each pixel in the speckle region may be also filled with pixels in the "adjacent four-vertex linear interpolation" manner described later, but the region filled in this manner is too smooth, moreover, processing the speckle region in the high-frequency component image in this manner will lead to loss of skin texture in the speckle region, and the image will be too smooth and unnatural.

According to one embodiment, the performing the speckle removal processing (such as the first speckle processing) on the speckle region in the high-frequency component image includes: performing mirror four-vertex linear interpolation on each pixel in the speckle region in the high-frequency component image, to fill each pixel; wherein, in the mirror four-vertex linear interpolation, for a target pixel to be filled, four boundaries of the speckle region having the target pixel in four direction as of top bottom, left, and right are determined and taken respectively as centers to determine four symmetrical pixels outside the speckle region of the target pixel, and a value determined by performing bilinear interpolation on the four symmetrical pixels is used as the pixel value of the target pixel, so as to fill the target pixel.

Figure 7:
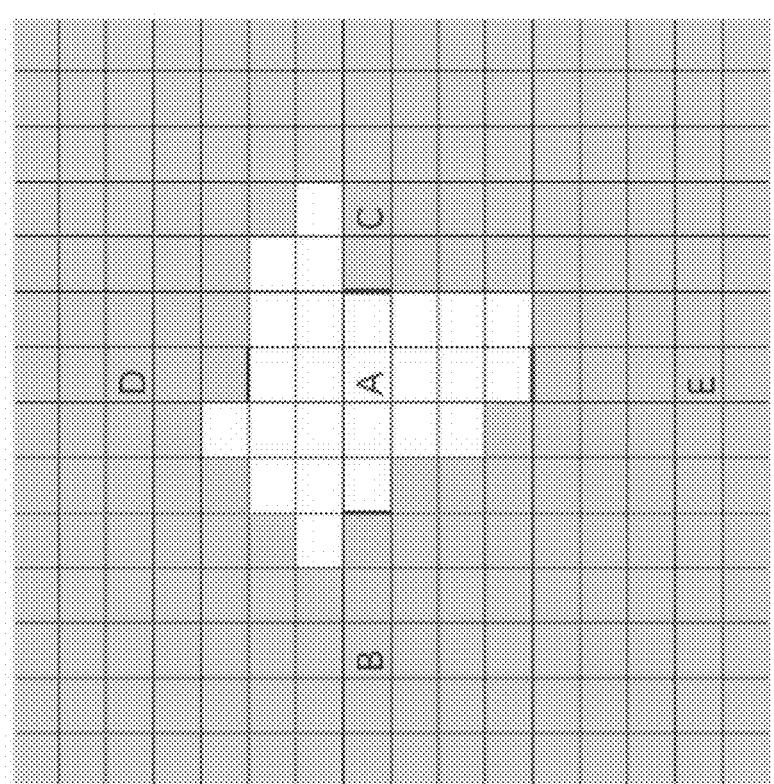
FIG. 7 is a schematic view of mirror four-vertex linear interpolation according to one embodiment.

The technical solution of this embodiment proposes a unique "mirror four-vertex linear interpolation" method to fill the speckle region in the high-frequency component image. For example, as shown in FIG. 7, taking pixel A as the target pixel to be filled as an example, the four boundaries of pixel A in the speckle region mask in four directions of top, bottom, left, and right are searched through the speckle region mask (the white pixel area in FIG. 7), and are taken respectively as centers to find the symmetrical pixels B, C, D, and E of pixel A. The pixel value of pixel A may be obtained by performing bilinear interpolation on pixels B, C, D and E. The calculation process of the bilinear interpolation is as follows:

$$V_a=1/(D_{ab}+D_{ac}+D_{ad}+D_{ae})*((D_{ad}+D_{ae})*(V_b*D_{ac}+\\ V_c*D_{ab})/(D_{ad}+D_{ac})+(D_{ab}+D_{ac})*(V_d*D_{ae}+\\ V_e*D_{ad})/(D_{ab}+D_{ae}))$$

wherein, $D_{ab}$ is the Euclidean distance between pixel A and pixel B, $D_{ac}$ is the Euclidean distance between pixel A and pixel C, $D_{ad}$ is the Euclidean distance between pixel A and pixel D, $D_{ae}$ is the Euclidean distance between pixel A and pixel E, $V_a$ is the calculated pixel value of pixel A, $V_b$ is the pixel value of pixel B, $V_c$ is the pixel value of pixel C, $V_d$ is the pixel value of pixel D, and $V_e$ is the pixel value of pixel E.

By repeating this operation, the filling value of each pixel in the speckle region of the high-frequency component image may be obtained. After the above "mirror four-vertex linear interpolation", the speckle region in the high-frequency component image may better restore the skin texture in the high-frequency component image.

According to one embodiment, the performing a dermabrasion processing (such as the second dermabrasion processing) on the skin flat region in the low-frequency component image includes: performing surface filtering on the skin flat region in the low-frequency component image.

According to this embodiment, for the skin flat region in the low-frequency component image, a conventional surface filter may be used as an edge-preserving filter to filter the skin flat region in the low-frequency component image to obtain an uniform skin base color.

After frequency division of the skin region image, the fine texture and small speckles of the skin will be concentrated in the high-frequency component image, while slightly larger speckles will still appear in the low-frequency component image. To achieve speckle removal effect, speckles may be filled in the low-frequency component image.

According to one embodiment, performing the speckle removal processing (such as the second speckle removal processing) on the speckle region in the low-frequency component image includes: performing adjacent four-vertex linear interpolation on each pixel in the speckle region in the low-frequency component image, to fill each pixel; wherein, in the adjacent four-vertex linear interpolation, for a target pixel to be filled, four nearest neighbor pixels to the target pixel outside the speckle region in four directions of top, bottom, left and right are determined, and a value determined by performing bilinear interpolation on the four nearest neighbor pixels is used as the pixel value of the target pixel, so as to fill the target pixel.

Figure 8:
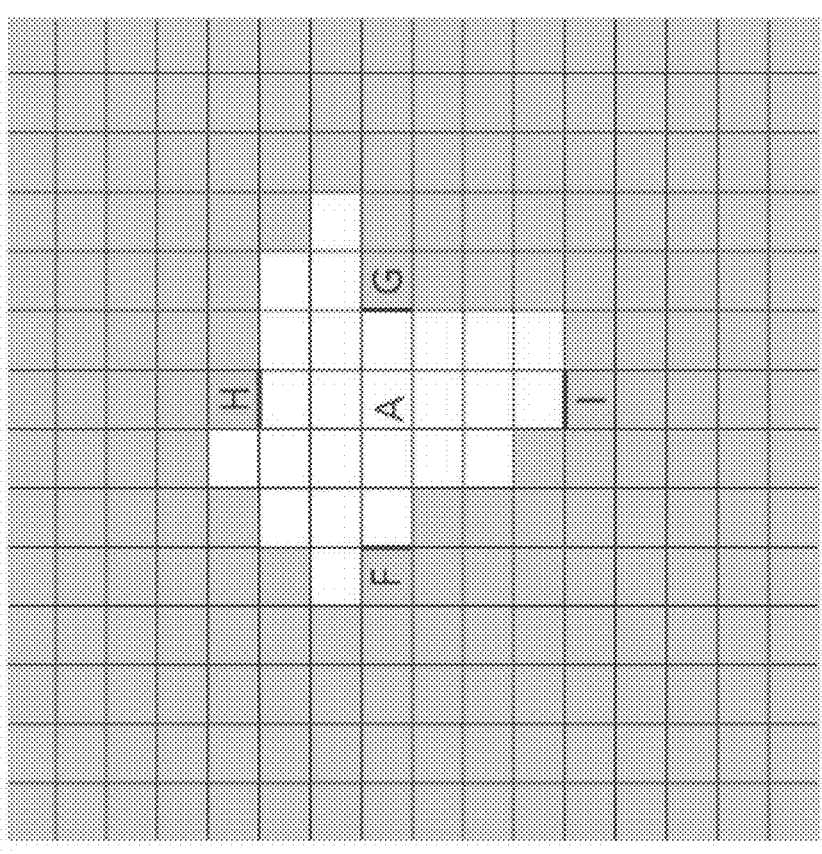
FIG. 8 is a schematic view of adjacent four-vertex linear interpolation according to one embodiment.

According to this embodiment, the "adjacent four-vertex linear interpolation" method is used to fill the speckle region in the low-frequency component image. For example, as shown in FIG. 8, taking pixel A as the target pixel to be filled as an example, the four nearest neighbor pixels F, G, H, I to pixel A outside the speckle region mask that are closest to pixel A in four directions of top, bottom, left and right are searched through the speckle region mask (the white pixel area in FIG. 8), that is, the four boundaries (the four bold line segments located above, below, left, and right of pixel A in FIG. 8) of pixel A in the speckle region mask in four directions of top, bottom, left and right are searched through the speckle region mask. The four pixels immediately adjacent to the four boundaries outside the speckle region mask are the four nearest neighbor pixels F, G, H, and I. The pixel value of pixel A may be obtained by performing bilinear interpolation on pixels F, G, H and I. The calculation process of this bilinear interpolation may similarly refer to that on pixels B, C, D and E, and will not be elaborated here.

By repeating this operation, the filling value of each pixel in the speckle region in the low-frequency component image is able to be obtained. After the above "adjacent four-vertex linear interpolation", the skin in the speckle region in the low-frequency component image is smooth and even, and a good speckle removal effect is able to be achieved.

It should be understood that, in other embodiments, the aforementioned "mirror four-vertex linear interpolation" method may also be used to fill the speckle region in the low-frequency component image.

According to one embodiment, the protection for the portrait structure region in the high-frequency component image and the low-frequency component image includes: generating a mask for the portrait structure region; wherein, the mask is used to ensure that, it is prohibited to perform the dermabrasion processing or the speckle removal processing on the portrait structure region, when performing the dermabrasion processing on the skin flat region and the speckle removal processing on the speckle region in the high-frequency component image and the low-frequency component image.

Figure 9:
FIG. 9 is a schematic view of protection for a portrait structure according to one embodiment.

As an example, as shown in FIG. 9, for facial beauty applications, the skin region including the face area may be used as an example. An AI model (such as the U-NET model mentioned above) may be used to extract the outer contour area of the face and the facial feature (including, for example, eyes, eyebrows, nose, and mouth) areas as the portrait structure region, to generate a mask for the portrait structure region to protect the high-frequency component and low-frequency component within the mask, namely, it is prohibited to perform the dermabrasion processing or the speckle removal processing on the portrait structure region in the high-frequency component image and the low-frequency component image, thereby enabling to avoid image blurring caused by the loss of facial features and contour information, and to maximize the retained clarity of the portrait structure in the image.

It should be understood that, although the steps in the flowcharts of FIGS. 2-4 are shown sequentially by the arrows, these steps are not necessarily executed in the order indicated by the arrows. There is no strict order limit for the execution of these steps, and they may be executed in other orders, unless explicitly stated in this context. Moreover, at least a portion of the steps in FIGS. 2-4 may include a plurality of sub-steps or stages, which may not necessarily be completed at the same time, but may be executed at different times, and may have an execution order that may not necessarily be sequential, as well as may be executed with at least a portion of other steps or sub-steps or stages thereof in turn or alternately.

Figure 10:
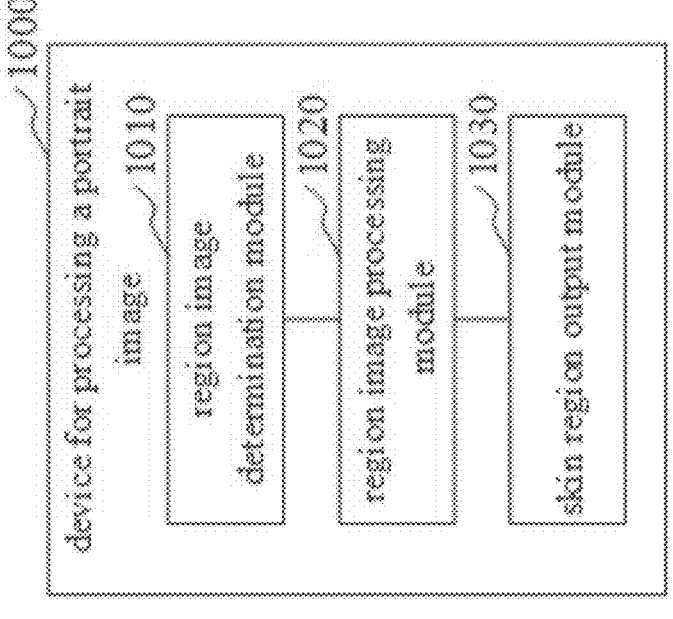
FIG. 10 is a structure block diagram of a device for processing a portrait image according to one embodiment.

According to one embodiment, as shown in FIG. 10, what is provided is a device for processing a portrait image 1000, which includes a region image determination module 1010, a region image processing module 1020, and a skin region output module 1030.

The region image determination module 1010 is used to determine a skin region image in a portrait image to be processed, as well as a skin flat region, a speckle region, and a portrait structure region included in a high-frequency component image and a low-frequency component image of the skin region image.

The region image processing module 1020 is used to perform a dermabrasion processing on the skin flat region and a speckle removal processing on the speckle region in the high-frequency component image and the low-frequency component image, respectively, with protection for the portrait structure region in the high-frequency component image and the low-frequency component image, to obtain a high-frequency output image after dermabrasion and speckle removal and a low-frequency output image after dermabrasion and speckle removal.

The skin region output module 1030 is used to overlay the high-frequency output image after dermabrasion and speckle removal with the low-frequency output image after dermabrasion and speckle removal, to obtain a skin region output image.

According to one embodiment, the device for processing a portrait image 1000 further includes:

a non-skin region extraction module 1040 for extracting a non-skin region image from the portrait image to be processed; and a portrait output module 1050 for stitching the non-skin region image with the skin region output image, to obtain a portrait output image.

The specific limitations of the device for processing a portrait image 1000 may be referred to those of the method for processing a portrait image in the above and will not be elaborated here. The various modules in the aforementioned device for processing a portrait image 1000 may be fully or partially implemented through software, hardware, and combinations thereof. The above various modules may be embedded in or independent on a processor in a computer equipment (such as an electronic equipment) in a form of a hardware or stored in a memory in a computer equipment (such as an electronic equipment) in a form of a software, for the processor to call and execute the operations corresponding to the above various modules.

Figure 11:
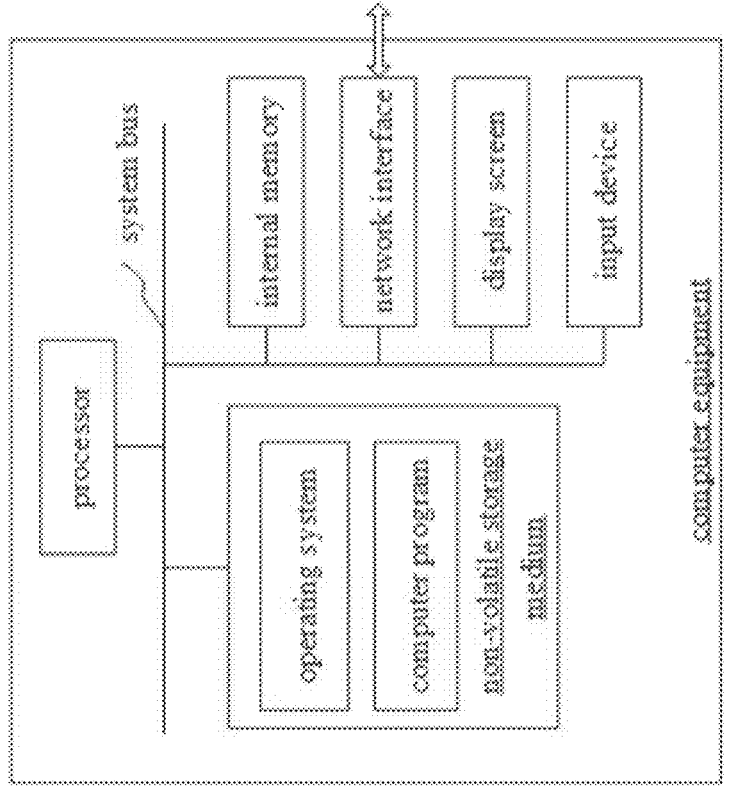
FIG. 11 is an internal structure diagram of an electronic equipment according to one embodiment.

According to one embodiment, what is provided is an electronic equipment, which may have an internal structure diagram as shown in FIG. 11. The electronic equipment includes a processor, a memory, a network interface, a display screen, and an input device connected through a system bus. Here, the processor of the electronic equipment is used to provide computing and control capabilities. The memory of the electronic equipment includes a non-volatile storage medium with an operating system and a computer program stored therein; and an internal memory which provides an environment for the operation of the operating system and the computer program in the non-volatile storage medium. The network interface of the electronic equipment is used to communicate with an external terminal through a network connection. The computer program is executed by the processor to implement an image distortion correction method. The display screen of the electronic equipment may be, for example, a liquid crystal display screen. The input device of the electronic equipment may be a touch layer covered on the display screen, may also be a key, a trackball, or a touchpad provided on a shell of the electronic equipment, but also an external keyboard, a touchpad, or a mouse, or the like.

Those skilled in the art should understand that the structure shown in FIG. 11 is only a block diagram of a portion of the structure related to embodiments of the present application and does not constitute a limitation on the electronic equipment on which the embodiments of the present application are applied. Specific electronic equipment may include more or fewer components than those shown in the figure, or may have certain components been combined, or have different component arrangements.

Figure 12:
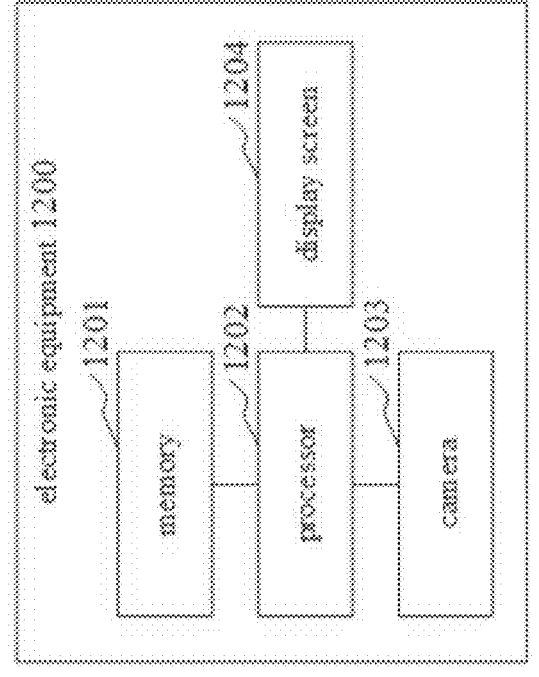
FIG. 12 is a schematic structure diagram of an electronic equipment according to one embodiment.

According to one embodiment, as shown in FIG. 12, what is provided is an electronic equipment 1200, which includes a memory 1201 and a processor 1202 connected to each other. The memory 1201 has a computer program stored therein. The processor 1202 executes the computer program by performing the following steps:

determining a skin region image in a portrait image to be processed, as well as a skin flat region, a speckle region, and a portrait structure region included in a high-frequency component image and a low-frequency component image of the skin region image;

performing a dermabrasion processing on the skin flat region and a speckle removal processing on the speckle region in the high-frequency component image and the low-frequency component image, respectively, with protection for the portrait structure region in the high-frequency component image and the low-frequency component image, to obtain a high-frequency output image after dermabrasion and speckle removal and a low-frequency output image after dermabrasion and speckle removal; and overlaying the high-frequency output image after dermabrasion and speckle removal with the low-frequency output image after dermabrasion and speckle removal, to obtain a skin region output image.

According to one embodiment, as shown in FIG. 12, the electronic equipment 1200 may also include a camera 1203 coupled thereto. The "coupled" aims to include both a form of directly providing the camera in the electronic equipment 1200, and a form of providing the camera outside the electronic equipment (such as providing the camera on other terminal devices) with communication connection between the camera and the electronic equipment 1200. The camera 1203 and the processor 1202 are connected by communication. The camera 1203 is used to capture a portrait image, and transmit the portrait image to the processor 1202. The processor 1202 receives the portrait image from the camera 1203.

According to one embodiment, as shown in FIG. 12, the electronic equipment 1200 may further include a display 1204 connected to the processor 1202. When the processor 1202 executes the computer program, it also controls the display 1204 to display the skin region output image or an image (such as a portrait output image) obtained after processing the skin region output image.

According to other embodiments, the processor 1202 further implements the steps of the method for processing a portrait image according to the above various embodiments of the present application when executing the computer program, and has the corresponding beneficial effects.

According to one embodiment, what is provided is a computer-readable storage medium, on which a computer program is stored. The computer program is executed by a processor by performing the following steps:

determining a skin region image in a portrait image to be processed, as well as a skin flat region, a speckle region, and a portrait structure region included in a high-frequency component image and a low-frequency component image of the skin region image; performing a dermabrasion processing on the skin flat region and a speckle removal processing on the speckle region in the high-frequency component image and the low-frequency component image, respectively, with protection for the portrait structure region in the high-frequency component image and the low-frequency component image, to obtain a high-frequency output image after dermabrasion and speckle removal and a low-frequency output image after dermabrasion and speckle removal; and overlaying the high-frequency output image after dermabrasion and speckle removal with the low-frequency output image after dermabrasion and speckle removal, to obtain a skin region output image.

According to other embodiments, the steps of the method for processing a portrait image according to the above various embodiments of the present application are further implemented when the computer program is executed by the processor, and having the corresponding beneficial effects.

Those skilled in the art may understand that, the implementation of all or part of the processes in the methods according to the above embodiments may be completed by instructing the relevant hardware through a computer program. The computer program may be stored in a non-volatile computer-readable storage medium and may include processes in examples of the above various methods when being executed. Herein, any reference to memory, storage, database, or other media used in the embodiments provided in the present application may include non-volatile and/or volatile memory. The non-volatile memory may include read-only memory (ROM), programmable ROM (PROM), electrically programmable ROM (EPROM), electrically erasable programmable ROM (EEPROM), or flash memory. The volatile memory may include random-access memory (RAM) or external cache. As an explanation rather than limitation, the RAM is available in various forms, such as static RAM (SRAM), dynamic RAM (DRAM), synchronous DRAM (SDRAM), dual data rate SDRAM (DDRS-DRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

The various technical features of the above embodiments may be combined arbitrarily. To make the description concise, not all possible combinations of various technical features in the above embodiments have been described. However, as long as there is no contradiction in the combinations of these technical features, they should be considered within the scope of this description.

The above embodiments only represent several embodiments of the present application, and the descriptions thereof are relatively specific and detailed, but may not be understood as limiting the scope of the present application. It should be pointed out that, for those skilled in the art, several modifications and improvements may be further made without departing from the concept of the present application, all of which fall within the scope of protection of the present application. Therefore, the scope of protection of the present application should be based on the attached claims.

While illustrative implementations of the application have been described in detail herein, it is to be understood that the inventive concepts may be otherwise variously embodied and employed, and that the appended claims are intended to be construed to include such variations, except as limited by the prior art.

Reference throughout this specification to "one implementation" or "an implementation" means that a particular feature, structure, or characteristic described in connection with the implementation is included in at least one implementation of the present invention. Thus, the appearances of the phrases "in one implementation" or "in some implementations" in various places throughout this specification are not necessarily all referring to the same implementation. Furthermore, the particular features, structures, or characteristics may be combined in any suitable manner in one or more implementations.

Systems and methods describing the present invention have been described. It will be understood that the descriptions of some embodiments of the present invention do not limit the various alternative, modified, and equivalent embodiments which may be include within the spirit and scope of the present invention as defined by the appended claims. Furthermore, in the detailed description above, numerous specific details are set forth to provide an understanding of various embodiments of the present invention. However, some embodiments of the present invention may be practiced without these specific details. In other instances, well known methods, procedures, and components have not been described in detail so as not to unnecessarily obscure aspects of the present embodiments.

What is claimed is:

1. A method for processing a portrait image, comprising:

determining a skin region image in a portrait image to be processed, as well as a skin flat region, a speckle region, and a portrait structure region comprised in a high-frequency component image and a low-frequency component image of the skin region image;

extracting a non-skin region image from the portrait image to be processed;

performing a dermabrasion processing on the skin flat region and a speckle removal processing on the speckle region in the high-frequency component image and the low-frequency component image, respectively, with protection for the portrait structure region in the high-frequency component image and the low-frequency component image, to obtain a high-frequency output image after dermabrasion and speckle removal and a low-frequency output image after dermabrasion and speckle removal; and overlaying the high-frequency output image after dermabrasion and speckle removal with the low-frequency output image after dermabrasion and speckle removal, to obtain a skin region output image, wherein a portrait output image is obtained based in part on the skin region output image and the non-skin region image.

2. The method according to claim 1, wherein determining the skin region image in a portrait image to be processed, as well as the skin flat region, the speckle region, and the portrait structure region comprised in a high-frequency component image and the low-frequency component image of the skin region image comprises:

identifying and extracting the skin region image from the portrait image to be processed;

dividing the skin region image into the high-frequency component image and the low-frequency component image; and identifying the skin flat region, the speckle region, and the portrait structure region comprised in the high-frequency component image and the low-frequency component image, respectively.

3. The method according to claim 1, further comprising: stitching the non-skin region image with the skin region output image, to obtain a portrait output image.

4. The method according to claim 2, wherein dividing the skin region image into the high-frequency component image and the low-frequency component image comprises:

performing Gaussian filtering on the skin region image, to obtain the low-frequency component image; and subtracting the low-frequency component image from the skin region image, to obtain the high-frequency component image.

5. The method according to claim 1, wherein performing the dermabrasion processing on the skin flat region and the speckle removal processing on the speckle region in the high-frequency component image and the low-frequency component image, respectively, with protection for the portrait structure region in the high-frequency component image and the low-frequency component image, to obtain the high-frequency output image after dermabrasion and speckle removal and the low-frequency output image after dermabrasion and speckle removal comprises:

performing a first dermabrasion processing on the skin flat region and a first speckle removal processing on the speckle region in the high-frequency component image, with protection for the portrait structure region in the high-frequency component image, to obtain the high-frequency output image after dermabrasion and speckle removal; and performing a second dermabrasion processing on the skin flat region and a second speckle removal processing on the speckle region in the low-frequency component image, with protection for the portrait structure region in the low-frequency component image, to obtain the low-frequency output image after dermabrasion and speckle removal.

6. The method according to claim 5, wherein the first dermabrasion processing is different from the second dermabrasion processing, and/or the first speckle removal processing is different from the second speckle removal processing.

7. The method according to claim 1, wherein performing the dermabrasion processing on the skin flat region in the high-frequency component image comprises:

performing a nonlinear attenuation on the skin flat region in the high-frequency component image;

wherein, in the nonlinear attenuation, each pixel value in the high-frequency component image is multiplied by a variable attenuation coefficient that decreases with the decrease of the pixel value multiplied thereby.

8. The method according to claim 1, wherein performing the speckle removal processing on the speckle region in the high-frequency component image comprises:

performing a mirror four-vertex linear interpolation on each pixel in the speckle region in the high-frequency component image, to fill each pixel;

wherein, in the mirror four-vertex linear interpolation, for a target pixel to be filled, four boundaries of the speckle region having the target pixel in four directions of top, bottom, left and right are determined and taken respectively as centers to determine four symmetrical pixels outside the speckle region of the target pixel, and a value determined by performing bilinear interpolation on the four symmetrical pixels is used as the pixel value of the target pixel, so as to fill the target pixel.

9. The method according to claim 1, wherein performing the dermabrasion processing on the skin flat region in the low-frequency component image comprises:

performing surface filtering on the skin flat region in the low-frequency component image.

10. The method according to claim 1, wherein performing the speckle removal processing on the speckle region in the low-frequency component image comprises:

performing adjacent four-vertex linear interpolation on each pixel in the speckle region in the low-frequency component image, to fill each pixel;

wherein, in the adjacent four-vertex linear interpolation, for a target pixel to be filled, four nearest neighbor pixels to the target pixel outside the speckle region in four directions of top, bottom, left and right are determined, and a value determined by performing bilinear interpolation on the four nearest neighbor pixels is used as the pixel value of the target pixel, so as to fill the target pixel.

11. The method according to claim 1, wherein the protection for the portrait structure region in the high-frequency component image and the low-frequency component image comprises:

generating a mask for the portrait structure region;

wherein, the mask is used to ensure that, it is prohibited to perform the dermabrasion processing or the speckle removal processing on the portrait structure region, when performing the dermabrasion processing on the skin flat region and the speckle removal processing on the speckle region in the high-frequency component image and the low-frequency component image.

12. A device for processing a portrait image, comprising:

a region image determination module for determining a skin region image in a portrait image to be processed, as well as a skin flat region, a spot region, and a portrait structure region comprised in a high-frequency component image and a low-frequency component image of the skin region image;

a region image processing module for performing a dermabrasion processing on the skin flat region and a speckle removal processing on the speckle region in the high-frequency component image and the low-frequency component image, respectively, with protection for the portrait structure region in the high-frequency component image and the low-frequency component image, to obtain a high-frequency output image after dermabrasion and speckle removal and a low-frequency output image after dermabrasion and speckle removal; and a skin region output module for overlaying the high-frequency output image after dermabrasion and speckle removal with the low-frequency output image after dermabrasion and speckle removal, to obtain a skin region output image.

13. An electronic equipment, comprising a memory that stores a computer program and a processor, wherein the processor executes the computer program by performing steps of the method according to claim 1.

14. A non-transitory computer-readable storage medium on which a computer program is stored, wherein the computer program is executed by a processor by performing steps of the method according to claim 1.

* * * * *